US009352269B2

(12) United States Patent
Tammera et al.

(10) Patent No.: US 9,352,269 B2
(45) Date of Patent: May 31, 2016

(54) APPARATUS AND SYSTEMS HAVING A ROTARY VALVE ASSEMBLY AND SWING ADSORPTION PROCESSES RELATED THERETO

(75) Inventors: Robert F. Tammera, Warrenton, VA (US); Thomas N. Anderson, Mobile, AL (US)

(73) Assignee: ExxonMobil Upstream Research Company, Spring, TX (US)

( * ) Notice: Subject to any disclaimer, the term of this patent is extended or adjusted under 35 U.S.C. 154(b) by 357 days.

(21) Appl. No.: 14/234,098

(22) PCT Filed: Feb. 27, 2012

(86) PCT No.: PCT/US2012/026808
§ 371 (c)(1),
(2), (4) Date: Apr. 8, 2014

(87) PCT Pub. No.: WO2012/161828
PCT Pub. Date: Nov. 29, 2012

(65) Prior Publication Data
US 2014/0216254 A1    Aug. 7, 2014

Related U.S. Application Data

(60) Provisional application No. 61/448,117, filed on Mar. 1, 2011, provisional application No. 61/448,120, filed on Mar. 1, 2011, provisional application No. 61/448,121, filed on Mar. 1, 2011, provisional application No. 61/448,123, filed on Mar. 1, 2011, provisional application No. 61/594,824, filed on Feb. 3, 2012.

(51) Int. Cl.
*B01D 53/047* (2006.01)
*B01D 53/04* (2006.01)

(52) U.S. Cl.
CPC .......... *B01D 53/047* (2013.01); *B01D 53/0462* (2013.01); *B01D 2259/40005* (2013.01)

(58) Field of Classification Search
CPC .. B01D 53/04; B01D 53/047; B01D 53/0462; B01D 2259/40005
USPC ............... 95/1, 90, 95; 96/109, 121, 124
See application file for complete search history.

(56) References Cited

U.S. PATENT DOCUMENTS

| 1,868,138 A | 7/1932 | Fisk |
| 3,124,152 A | 3/1964 | Payne ........................ 137/269.5 |

(Continued)

FOREIGN PATENT DOCUMENTS

| CA | 2297590 | 9/2000 | ........... B01D 53/047 |
| CA | 2297591 | 9/2000 | ................ F17D 1/02 |

(Continued)

OTHER PUBLICATIONS

U.S. Appl. No. 13/602,750, filed Sep. 4, 2012, Sundaram, N. et al.

(Continued)

*Primary Examiner* — Frank Lawrence
(74) *Attorney, Agent, or Firm* — ExxonMobil Upstream Research Company Law Dept.

(57) ABSTRACT

Provided are apparatus and systems having a rotary valve assembly integrated with a reciprocating valve assembly to perform swing adsorption processes. The rotary valve assembly is utilized with the reciprocating valve assembly to manage the flow of streams through the system in an enhanced manner.

20 Claims, 6 Drawing Sheets

(56) References Cited

U.S. PATENT DOCUMENTS

| | | | | |
|---|---|---|---|---|
| 3,142,547 | A | 7/1964 | Marsh et al. | 55/26 |
| 3,505,783 | A * | 4/1970 | Graham | 95/25 |
| 3,508,758 | A | 4/1970 | Strub | 277/15 |
| 3,602,247 | A | 8/1971 | Bunn et al. | 137/270 |
| 3,788,036 | A | 1/1974 | Lee et al. | 55/25 |
| 3,967,464 | A | 7/1976 | Cormier et al. | 62/13 |
| 4,261,815 | A | 4/1981 | Kelland | 209/213 |
| 4,324,565 | A | 4/1982 | Benkmann | 55/23 |
| 4,325,565 | A | 4/1982 | Winchell | 280/282 |
| 4,329,162 | A | 5/1982 | Pitcher | 55/523 |
| 4,340,398 | A | 7/1982 | Doshi et al. | 55/25 |
| 4,711,968 | A | 12/1987 | Oswald et al. | 568/454 |
| 4,770,676 | A | 9/1988 | Sircar et al. | 55/26 |
| 4,784,672 | A | 11/1988 | Sircar | 55/26 |
| 4,790,272 | A | 12/1988 | Woolenweber | 123/188 |
| 4,816,039 | A | 3/1989 | Krishnamurthy et al. | 55/26 |
| 4,877,429 | A | 10/1989 | Hunter | 55/162 |
| 4,977,745 | A | 12/1990 | Heichberger | 62/10 |
| 5,110,328 | A | 5/1992 | Yokota et al. | 55/180 |
| 5,125,934 | A | 6/1992 | Krishnamurthy et al. | 55/25 |
| 5,169,006 | A | 12/1992 | Stelzer | 209/223.1 |
| 5,174,796 | A | 12/1992 | Davis et al. | 55/26 |
| 5,224,350 | A | 7/1993 | Mehra | 62/17 |
| 5,234,472 | A | 8/1993 | Krishnamurthy et al. | 95/98 |
| 5,292,990 | A | 3/1994 | Kantner et al. | 585/820 |
| 5,306,331 | A | 4/1994 | Auvil et al. | 95/42 |
| 5,365,011 | A | 11/1994 | Ramachandran et al. | 585/829 |
| 5,370,728 | A | 12/1994 | LaSala et al. | 95/101 |
| 5,565,018 | A | 10/1996 | Baksh et al. | 95/100 |
| 5,700,310 | A | 12/1997 | Bowman et al. | 95/45 |
| 5,733,451 | A | 3/1998 | Coellner et al. | 210/496 |
| 5,750,026 | A | 5/1998 | Gadkaree et al. | 201/502.1 |
| 5,792,239 | A | 8/1998 | Reinhold, III et al. | 95/101 |
| 5,807,423 | A | 9/1998 | Lemcoff et al. | 95/96 |
| 5,811,616 | A | 9/1998 | Holub et al. | 585/504 |
| 5,827,358 | A * | 10/1998 | Kulish et al. | 96/115 |
| 5,891,217 | A * | 4/1999 | Lemcoff et al. | 95/96 |
| 5,906,673 | A | 5/1999 | Reinhold, III et al. | 95/45 |
| 5,924,307 | A | 7/1999 | Nenov | 62/643 |
| 5,935,444 | A | 8/1999 | Johnson et al. | 210/691 |
| 5,968,234 | A | 10/1999 | Midgett, II et al. | 95/120 |
| 5,976,221 | A | 11/1999 | Bowman et al. | 95/45 |
| 5,997,617 | A | 12/1999 | Czabala et al. | 96/130 |
| 6,007,606 | A | 12/1999 | Baksh et al. | 95/98 |
| 6,011,192 | A | 1/2000 | Baker et al. | 585/818 |
| 6,053,966 | A | 4/2000 | Moreau et al. | 95/96 |
| 6,063,161 | A * | 5/2000 | Keefer et al. | 95/100 |
| 6,099,621 | A | 8/2000 | Ho | 95/139 |
| 6,129,780 | A | 10/2000 | Millet et al. | 95/117 |
| 6,136,222 | A | 10/2000 | Friesen et al. | 252/184 |
| 6,147,126 | A | 11/2000 | DeGeorge et al. | 518/715 |
| 6,171,371 | B1 | 1/2001 | Derive et al. | 95/98 |
| 6,176,897 | B1 | 1/2001 | Keefer | 95/98 |
| 6,179,900 | B1 | 1/2001 | Behling et al. | 95/45 |
| 6,194,079 | B1 | 2/2001 | Hekal | 428/566 |
| 6,210,466 | B1 | 4/2001 | Whysall et al. | 95/100 |
| 6,231,302 | B1 | 5/2001 | Bonardi | 415/105 |
| 6,245,127 | B1 | 6/2001 | Kane et al. | 95/101 |
| 6,284,021 | B1 | 9/2001 | Lu et al. | 95/96 |
| 6,311,719 | B1 | 11/2001 | Hill et al. | 137/312 |
| 6,345,954 | B1 | 2/2002 | Al-Himyary et al. | 415/112 |
| 6,398,853 | B1 | 6/2002 | Keefer et al. | 96/125 |
| 6,402,813 | B2 | 6/2002 | Monereau et al. | 95/96 |
| 6,406,523 | B1 | 6/2002 | Connor et al. | 96/125 |
| 6,436,171 | B1 | 8/2002 | Wang et al. | 95/96 |
| 6,444,012 | B1 | 9/2002 | Dolan et al. | 95/99 |
| 6,444,014 | B1 | 9/2002 | Mullhaupt et al. | 95/130 |
| 6,444,523 | B1 | 9/2002 | Fan et al. | 438/257 |
| 6,451,095 | B1 | 9/2002 | Keefer et al. | 96/125 |
| 6,457,485 | B2 | 10/2002 | Hill et al. | 137/240 |
| 6,471,939 | B1 | 10/2002 | Boix et al. | 423/706 |
| 6,488,747 | B1 | 12/2002 | Keefer | 96/125 |
| 6,497,750 | B2 | 12/2002 | Butwell et al. | 95/96 |
| 6,500,241 | B2 | 12/2002 | Reddy | 96/134 |
| 6,500,404 | B1 | 12/2002 | Camblor Fernandez et al. | 423/706 |
| 6,506,351 | B1 | 1/2003 | Jain et al. | 423/239.1 |
| 6,514,318 | B2 | 2/2003 | Keefer | 95/96 |
| 6,514,319 | B2 | 2/2003 | Keefer et al. | 95/101 |
| 6,517,609 | B1 | 2/2003 | Monereau et al. | 95/96 |
| 6,531,516 | B2 | 3/2003 | Davis et al. | 518/700 |
| 6,533,846 | B1 | 3/2003 | Keefer et al. | 96/125 |
| 6,565,627 | B1 | 5/2003 | Golden et al. | 95/96 |
| 6,565,635 | B2 | 5/2003 | Keefer et al. | 96/125 |
| 6,565,825 | B2 | 5/2003 | Ohji et al. | 423/625 |
| 6,572,678 | B1 | 6/2003 | Wijmans et al. | 95/47 |
| 6,579,341 | B2 | 6/2003 | Baker et al. | 95/39 |
| 6,593,541 | B1 | 7/2003 | Herren | 219/121.67 |
| 6,595,233 | B2 | 7/2003 | Pulli | 137/115.05 |
| 6,605,136 | B1 | 8/2003 | Graham et al. | 95/98 |
| 6,607,584 | B2 | 8/2003 | Moreau et al. | 95/117 |
| 6,630,012 | B2 | 10/2003 | Wegeng et al. | 95/106 |
| 6,641,645 | B1 | 11/2003 | Lee et al. | 95/98 |
| 6,651,645 | B1 | 11/2003 | Nunez-Suarez | |
| 6,660,064 | B2 | 12/2003 | Golden et al. | 95/96 |
| 6,660,065 | B2 | 12/2003 | Byrd et al. | 95/117 |
| 6,692,626 | B2 | 2/2004 | Keefer et al. | 204/491 |
| 6,712,087 | B2 | 3/2004 | Hill et al. | 137/240 |
| 6,742,507 | B2 | 6/2004 | Keefer et al. | 123/585 |
| 6,746,515 | B2 | 6/2004 | Wegeng et al. | 95/96 |
| 6,752,852 | B1 | 6/2004 | Jacksier et al. | 95/117 |
| 6,802,889 | B2 | 10/2004 | Graham et al. | 95/96 |
| 6,835,354 | B2 | 12/2004 | Woods et al. | 422/139 |
| 6,840,985 | B2 | 1/2005 | Keefer | 96/125 |
| 6,866,950 | B2 | 3/2005 | Connor et al. | 429/13 |
| 6,889,710 | B2 | 5/2005 | Wagner | 137/625.46 |
| 6,893,483 | B2 | 5/2005 | Golden et al. | 95/96 |
| 6,902,602 | B2 | 6/2005 | Keefer et al. | 95/97 |
| 6,916,358 | B2 | 7/2005 | Nakamura et al. | 95/96 |
| 6,918,953 | B2 | 7/2005 | Lomax, Jr. et al. | 96/130 |
| 6,921,597 | B2 | 7/2005 | Keefer et al. | 429/34 |
| 6,974,496 | B2 | 12/2005 | Wegeng et al. | 96/126 |
| 7,025,801 | B2 | 4/2006 | Monereau | 95/8 |
| 7,077,891 | B2 | 7/2006 | Jaffe et al. | 96/108 |
| 7,087,331 | B2 | 8/2006 | Keefer et al. | 429/17 |
| 7,094,275 | B2 | 8/2006 | Keefer et al. | 96/125 |
| 7,097,925 | B2 | 8/2006 | Keefer | 429/9 |
| 7,117,669 | B2 | 10/2006 | Kaboord et al. | 60/288 |
| 7,144,016 | B2 | 12/2006 | Gozdawa | 277/399 |
| 7,160,356 | B2 | 1/2007 | Koros et al. | 95/50 |
| 7,160,367 | B2 | 1/2007 | Babicki et al. | 96/116 |
| 7,166,149 | B2 | 1/2007 | Dunne et al. | 95/113 |
| 7,172,645 | B1 | 2/2007 | Pfister et al. | 95/116 |
| 7,189,280 | B2 | 3/2007 | Alizadeh-Khiavi et al. | 95/130 |
| 7,250,073 | B2 | 7/2007 | Keefer et al. | 95/96 |
| 7,250,074 | B2 | 7/2007 | Tonkovich et al. | 95/130 |
| 7,276,107 | B2 | 10/2007 | Baksh et al. | 95/96 |
| 7,279,029 | B2 | 10/2007 | Occhialini et al. | 96/121 |
| 7,285,350 | B2 | 10/2007 | Keefer et al. | 429/34 |
| 7,297,279 | B2 | 11/2007 | Johnson et al. | 210/669 |
| 7,311,763 | B2 | 12/2007 | Neary | 96/121 |
| RE40,006 | E | 1/2008 | Keefer et al. | 95/100 |
| 7,314,503 | B2 | 1/2008 | Landrum et al. | 95/50 |
| 7,354,562 | B2 | 4/2008 | Ying et al. | 423/437.2 |
| 7,387,849 | B2 | 6/2008 | Keefer et al. | 429/34 |
| 7,390,350 | B2 | 6/2008 | Weist, Jr. et al. | 95/100 |
| 7,404,846 | B2 | 7/2008 | Golden et al. | 95/103 |
| 7,449,049 | B2 | 11/2008 | Thomas et al. | 95/123 |
| 7,510,601 | B2 | 3/2009 | Whitley et al. | 96/121 |
| 7,527,670 | B2 | 5/2009 | Ackley et al. | 95/96 |
| 7,553,568 | B2 | 6/2009 | Keefer | 429/13 |
| 7,578,864 | B2 | 8/2009 | Watanabe et al. | 55/523 |
| 7,604,682 | B2 | 10/2009 | Seaton | 95/96 |
| 7,637,989 | B2 | 12/2009 | Bong | 96/130 |
| 7,641,716 | B2 | 1/2010 | Lomax, Jr. et al. | 95/96 |
| 7,645,324 | B2 | 1/2010 | Rode et al. | 95/96 |
| 7,651,549 | B2 | 1/2010 | Whitley | 95/96 |
| 7,674,319 | B2 | 3/2010 | Lomax, Jr. et al. | 95/19 |
| 7,674,539 | B2 | 3/2010 | Keefer et al. | 429/17 |
| 7,687,044 | B2 | 3/2010 | Keefer et al. | 422/211 |
| 7,713,333 | B2 | 5/2010 | Rege et al. | 95/96 |
| 7,717,981 | B2 | 5/2010 | LaBuda et al. | 95/96 |
| 7,722,700 | B2 | 5/2010 | Sprinkle | 95/22 |

(56) References Cited

U.S. PATENT DOCUMENTS

| | | | |
|---|---|---|---|
| 7,731,782 B2 | 6/2010 | Kelley et al. | 95/139 |
| 7,740,687 B2 | 6/2010 | Reinhold, III | 95/96 |
| 7,744,676 B2 | 6/2010 | Leitmayr et al. | 95/99 |
| 7,758,988 B2 | 7/2010 | Keefer et al. | 429/34 |
| 7,763,098 B2 | 7/2010 | Alizadeh-Khiavi et al. | 95/96 |
| 7,819,948 B2 | 10/2010 | Wagner | 95/100 |
| 7,828,877 B2 | 11/2010 | Sawada et al. | 95/96 |
| 7,846,239 B2 * | 12/2010 | Yamawaki et al. | 95/90 |
| 7,854,793 B2 | 12/2010 | Rarig et al. | 96/116 |
| 7,858,169 B2 | 12/2010 | Yamashita | 428/116 |
| 7,862,645 B2 | 1/2011 | Whitley et al. | 95/96 |
| 7,938,886 B2 | 5/2011 | Hershkowitz et al. | 95/115 |
| 7,947,118 B2 | 5/2011 | Rarig et al. | 95/98 |
| 7,947,120 B2 | 5/2011 | Deckman et al. | 95/139 |
| 7,959,720 B2 | 6/2011 | Deckman et al. | 96/130 |
| 8,016,918 B2 | 9/2011 | LaBuda et al. | 95/96 |
| 8,034,164 B2 | 10/2011 | Lomax, Jr. et al. | 95/121 |
| 8,071,063 B2 | 12/2011 | Reyes et al. | 423/248 |
| 8,142,745 B2 | 3/2012 | Reyes et al. | 423/213.2 |
| 8,142,746 B2 | 3/2012 | Reyes et al. | 423/213.2 |
| 8,192,709 B2 | 6/2012 | Reyes et al. | 423/245.1 |
| 8,262,783 B2 | 9/2012 | Stoner et al. | 96/108 |
| 8,268,043 B2 | 9/2012 | Celik et al. | 95/96 |
| 8,268,044 B2 | 9/2012 | Wright et al. | 95/96 |
| 8,272,401 B2 | 9/2012 | McLean | 137/625.11 |
| 8,319,090 B2 | 11/2012 | Kitamura | 136/244 |
| 8,361,200 B2 | 1/2013 | Sayari et al. | 95/139 |
| 8,444,750 B2 | 5/2013 | Deckman et al. | 95/96 |
| 8,470,395 B2 | 6/2013 | Khiavi et al. | 427/180 |
| 8,512,569 B2 | 8/2013 | Eaton et al. | 210/650 |
| 8,518,356 B2 | 8/2013 | Schaffer et al. | 423/220 |
| 8,529,662 B2 | 9/2013 | Kelley et al. | 95/96 |
| 8,529,663 B2 | 9/2013 | Reyes et al. | 95/96 |
| 8,529,664 B2 | 9/2013 | Deckman et al. | 95/96 |
| 8,529,665 B2 | 9/2013 | Manning et al. | 95/96 |
| 8,535,414 B2 | 9/2013 | Johnson et al. | 95/95 |
| 8,545,602 B2 | 10/2013 | Chance et al. | 95/96 |
| 8,551,444 B2 | 10/2013 | Agnihotri et al. | 423/648.1 |
| 8,591,627 B2 | 11/2013 | Jain | 95/52 |
| 8,591,634 B2 | 11/2013 | Winchester et al. | 96/127 |
| 8,616,233 B2 | 12/2013 | McLean et al. | 137/246.22 |
| 8,752,390 B2 | 6/2014 | Wright et al. | 60/780 |
| 8,795,411 B2 | 8/2014 | Hufton et al. | 95/90 |
| 8,808,425 B2 | 8/2014 | Genkin et al. | 95/96 |
| 8,814,985 B2 | 8/2014 | Gerds et al. | 95/90 |
| 2001/0047824 A1 | 12/2001 | Hill et al. | 137/312 |
| 2002/0124885 A1 | 9/2002 | Hill et al. | 137/312 |
| 2002/0162452 A1 | 11/2002 | Butwell et al. | 95/96 |
| 2003/0075485 A1 | 4/2003 | Ghijsen | 208/308 |
| 2003/0131728 A1 | 7/2003 | Kanazirev et al. | 95/96 |
| 2003/0170527 A1 | 9/2003 | Finn et al. | 429/34 |
| 2003/0205130 A1 | 11/2003 | Neu et al. | 95/90 |
| 2003/0223856 A1 | 12/2003 | Yuri et al. | 415/1 |
| 2004/0099142 A1 | 5/2004 | Arquin et al. | 96/134 |
| 2004/0197596 A1 | 10/2004 | Connor et al. | 428/630 |
| 2004/0232622 A1 | 11/2004 | Gozdawa | 277/401 |
| 2005/0109419 A1 | 5/2005 | Ohmi et al. | 141/4 |
| 2005/0114032 A1 | 5/2005 | Wang | 702/14 |
| 2005/0129952 A1 | 6/2005 | Sawada et al. | 428/409 |
| 2005/0145111 A1 | 7/2005 | Keefer et al. | 96/124 |
| 2005/0150378 A1 | 7/2005 | Dunne et al. | 95/113 |
| 2005/0229782 A1 | 10/2005 | Monereau et al. | 95/96 |
| 2005/0252378 A1 | 11/2005 | Celik et al. | 96/121 |
| 2006/0048648 A1 | 3/2006 | Gibbs et al. | 96/108 |
| 2006/0049102 A1 | 3/2006 | Miller et al. | 210/500.27 |
| 2006/0099096 A1 | 5/2006 | Shaffer et al. | 418/55.1 |
| 2006/0105158 A1 | 5/2006 | Fritz et al. | 428/317.9 |
| 2006/0162556 A1 | 7/2006 | Ackley et al. | 95/96 |
| 2006/0165574 A1 | 7/2006 | Sayari | 423/210 |
| 2006/0169142 A1 | 8/2006 | Rode et al. | 96/129 |
| 2006/0236862 A1 | 10/2006 | Golden et al. | 95/96 |
| 2007/0084241 A1 | 4/2007 | Kretchmer et al. | 63/29.2 |
| 2007/0084344 A1 | 4/2007 | Moriya et al. | 95/210 |
| 2007/0222160 A1 | 9/2007 | Roberts-Haritonov et al. | 277/387 |
| 2007/0253872 A1 | 11/2007 | Keefer et al. | 422/143 |
| 2007/0283807 A1 | 12/2007 | Whitley | 95/96 |
| 2008/0051279 A1 | 2/2008 | Klett et al. | 502/60 |
| 2008/0072822 A1 | 3/2008 | White | 118/722 |
| 2008/0128655 A1 | 6/2008 | Garg et al. | 252/373 |
| 2008/0282883 A1 | 11/2008 | Rarig et al. | 95/96 |
| 2008/0289497 A1 | 11/2008 | Barclay et al. | 95/114 |
| 2008/0307966 A1 | 12/2008 | Stinson | 95/187 |
| 2009/0004073 A1 | 1/2009 | Gleize et al. | 422/180 |
| 2009/0014902 A1 | 1/2009 | Koivunen et al. | 264/11 |
| 2009/0025553 A1 | 1/2009 | Keefer et al. | 95/96 |
| 2009/0037550 A1 | 2/2009 | Mishra et al. | 708/208 |
| 2009/0071333 A1 | 3/2009 | LaBuda et al. | 95/96 |
| 2009/0079870 A1 | 3/2009 | Matsui | 348/558 |
| 2009/0107332 A1 | 4/2009 | Wagner | 95/100 |
| 2009/0151559 A1 | 6/2009 | Verma et al. | 95/96 |
| 2009/0162268 A1 | 6/2009 | Hufton et al. | 423/210 |
| 2009/0180423 A1 | 7/2009 | Kroener | 370/328 |
| 2009/0241771 A1 | 10/2009 | Manning et al. | 95/15 |
| 2009/0308248 A1 | 12/2009 | Siskin et al. | 95/236 |
| 2010/0059701 A1 | 3/2010 | McLean | 251/304 |
| 2010/0077920 A1 | 4/2010 | Baksh et al. | 95/97 |
| 2010/0089241 A1 | 4/2010 | Stoner et al. | 96/125 |
| 2010/0212493 A1 | 8/2010 | Rasmussen et al. | 95/45 |
| 2010/0252497 A1 | 10/2010 | Ellison et al. | 210/500.1 |
| 2010/0263534 A1 | 10/2010 | Chuang | 95/139 |
| 2010/0282593 A1 | 11/2010 | Speirs et al. | 203/11 |
| 2011/0031103 A1 | 2/2011 | Deckman et al. | 203/41 |
| 2011/0146494 A1 | 6/2011 | Desai et al. | 96/115 |
| 2011/0217218 A1 | 9/2011 | Gupta et al. | 423/228 |
| 2011/0277620 A1 | 11/2011 | Havran et al. | 89/1.14 |
| 2011/0308524 A1 | 12/2011 | Brey et al. | 128/205.12 |
| 2012/0024152 A1 | 2/2012 | Yamawaki et al. | 95/96 |
| 2012/0031144 A1 | 2/2012 | Northrop et al. | 62/617 |
| 2012/0067216 A1 | 3/2012 | Corma-Canos et al. | 95/95 |
| 2012/0152115 A1 | 6/2012 | Gerds et al. | 95/90 |
| 2012/0222551 A1 | 9/2012 | Deckman | 95/96 |
| 2012/0222552 A1 | 9/2012 | Ravikovitch et al. | 95/97 |
| 2012/0222553 A1 | 9/2012 | Kamakoti et al. | 95/99 |
| 2012/0222554 A1 | 9/2012 | Leta et al. | 95/104 |
| 2012/0222555 A1 | 9/2012 | Gupta et al. | 95/136 |
| 2012/0255377 A1 | 10/2012 | Kamakoti et al. | 73/863.23 |
| 2012/0308456 A1 | 12/2012 | Leta et al. | 423/228 |
| 2012/0312163 A1 | 12/2012 | Leta et al. | 95/97 |
| 2013/0061755 A1 | 3/2013 | Frederick et al. | 96/110 |
| 2013/0225898 A1 | 8/2013 | Sundaram et al. | 585/802 |

FOREIGN PATENT DOCUMENTS

| | | | |
|---|---|---|---|
| CA | 2224471 | 10/2000 | B01D 53/047 |
| CA | 2234924 | 12/2001 | B01D 53/047 |
| CA | 2237103 | 12/2001 | B01D 53/047 |
| CA | 2228206 | 1/2002 | B01D 53/047 |
| CA | 2357356 | 11/2005 | B01D 53/047 |
| CA | 2616701 | 2/2007 | B01D 53/14 |
| EP | 0257493 | 2/1988 | B01D 53/04 |
| EP | 0426937 | 5/1991 | B01D 53/04 |
| EP | 1004341 | 5/2000 | B01D 53/047 |
| EP | 1018359 | 7/2000 | B01D 53/047 |
| EP | 1413348 | 8/2002 | B01D 53/04 |
| EP | 1577561 | 9/2005 | F04D 29/10 |
| EP | 1203610 | 12/2005 | B01D 53/053 |
| EP | 1674555 | 6/2006 | B01D 53/04 |
| EP | 1798197 | 6/2007 | C01B 21/04 |
| EP | 1045728 | 11/2009 | B01D 53/00 |
| JP | 58-114715 | 7/1983 | B01D 53/50 |
| JP | 59-232174 | 12/1984 | C10K 1/32 |
| JP | 2000024445 | 8/2001 | B32B 25/08 |
| JP | 2002348651 | 12/2002 | C23C 2/06 |
| JP | 2006016470 | 1/2006 | B01D 46/30 |
| JP | 2006036849 | 2/2006 | C10L 3/10 |
| JP | 2008272534 | 11/2008 | B01D 53/04 |
| WO | WO99/43418 | 9/1999 | B01D 53/053 |
| WO | WO00/35560 | 6/2000 | B01D 53/04 |
| WO | WO02/073728 | 9/2002 | H01M 8/06 |
| WO | WO2005/032694 | 4/2005 | B01D 53/04 |
| WO | WO2005/070518 | 8/2005 | B01D 53/06 |
| WO | WO2006/017940 | 2/2006 | B01J 8/02 |
| WO | WO2006/074343 | 7/2006 | B01D 53/02 |

(56) References Cited

FOREIGN PATENT DOCUMENTS

| WO | WO2007/111738 | 10/2007 | ............... F25J 3/08 |
|----|---------------|---------|---------------------------|
| WO | WO2010/130787 | 11/2010 | ............ B01D 53/14 |
| WO | WO2011/139894 | 11/2011 | ............ B01D 53/47 |
| WO | WO2012/118755 | 9/2012 | ............ B01J 20/28 |
| WO | WO2012/118757 | 9/2012 | ............ F16K 11/00 |
| WO | WO2012/118758 | 9/2012 | |
| WO | WO2012/118759 | 9/2012 | |
| WO | WO2012/118760 | 9/2012 | |
| WO | WO2012/161826 | 11/2012 | |
| WO | WO2013/022529 | 2/2013 | |

OTHER PUBLICATIONS

Conviser, S. A. (1964) "Removal of CO2 from Natural Gas With Molecular Sieves," *Proceedings of the Gas Conditioning Conf., Univ. of Oklahoma*, pp. 1F-12F.

ExxonMobil Research and Engineering and Xebec (2008) RCPSA-Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

GE Oil & Gas (2007) "Dry Gas Seal Retrofit," Florene, Italy, www.ge.com/oilandgas, 4 pgs.

Farooq, S. et al. (1990) "Continuous Contercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Sahni, I et al. (2005) "Multiresolution Wavelet Analysis for Improved Reservoir Description," SPE-87820, *Soc. of Petroleum Eng.—Reservoir Evaluation & Engineering*, pp. 53-69 (XP-002550569).

Stahley, J. S. (2003) "Design, Operation, and Maintenance Considerations for Improved Dry Gas Seal Reliability in Centrifugal Compressors," *Dresser-Rand, Tech. Paper* 134, 15 pgs.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEMS HAVING A ROTARY VALVE ASSEMBLY AND SWING ADSORPTION PROCESSES RELATED THERETO

CROSS REFERENCE TO RELATED APPLICATIONS

This application is the National Stage of International Application No. PCT/US2012/026808, filed Feb. 27, 2012, which claims the benefit of U.S. Patent Application No. 61/448,117 entitled APPARATUS AND SYSTEMS HAVING AN ENCASED ADSORBENT CONTACTOR AND SWING ADSORPTION PROCESSES RELATED THERETO, filed Mar. 1, 2011; U.S. Patent Application No. 61/448,120 entitled APPARATUS AND SYSTEMS HAVING A RECIPROCATING VALVE HEAD ASSEMBLY AND SWING ADSORPTION PROCESSES RELATED THERETO, filed Mar. 1, 2011; U.S. Patent Application No. 61/448,121 entitled METHODS OF REMOVING CONTAMINANTS FROM A HYDROCARBON STREAM BY SWING ADSORPTION AND RELATED APPARATUS AND SYSTEMS, filed Mar. 1, 2011; U.S. Patent Application No. 61/448,123 entitled APPARATUS AND SYSTEMS HAVING A ROTARY VALVE ASSEMBLY AND SWING ADSORPTION PROCESSES RELATED THERETO, filed Mar. 1, 2011; and U.S. Patent Application No. 61/594,824, entitled METHODS OF REMOVING CONTAMINANTS FROM A HYDROCARBON STREAM BY SWING ADSORPTION AND RELATED APAPRATUS AND SYSTEMS, filed Feb. 3, 2012, each of which is herein incorporated by reference in its entirety.

FIELD OF THE INVENTION

The present application provides apparatus and systems having a rotary valve assembly and swing adsorption separation techniques related thereto. More particularly, the present application provides a mechanical configuration, which integrates and bi-directionally transfers gaseous streams through a swing adsorption system via reciprocating and rotary valve assemblies. In addition, this application employs the use of non-mechanical switchgear, which provides real-time coordination of the reciprocating valves with the rotary valve assembly.

BACKGROUND OF THE INVENTION

Gas separation is useful in many industries and can typically be accomplished by flowing a mixture of gases over an adsorbent that preferentially adsorbs one or more gas components while not adsorbing one or more other gas components. The non-adsorbed components are then recovered as a separate product.

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide is selectively adsorbed by the adsorbent, and the gas exiting the vessel is enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

In these swing adsorption processes, various adsorbent bed assemblies are coupled together with conduits and valves to manage the flow of fluids. Orchestrating these adsorbent bed assemblies involves coordinating the cycles for each of the adsorbent bed assemblies with other adsorbent bed assemblies in the system. A complete cycle can vary from seconds to minutes as it transfers a plurality of gaseous streams through the adsorbent bed assembly.

However, swing adsorption systems do not properly manage the void space within the conduits of the system. Typically, these systems are distributed with various conduits being different lengths for the different adsorbent bed assemblies. This void space has a gas from the previous stream, which has to be displaced as part of the process. Accordingly, the conventional systems for swing adsorption are inefficient in managing the streams passing through the system in the various steps of the cycle.

There remains a need in the industry for apparatus, methods, and systems that are more efficient and that can be constructed and employed on a smaller footprint than conventional equipment. The more efficient management of the streams along with more compact designs are beneficial when the swing adsorption apparatus is to be deployed in remote locations, such as off-shore production platforms, arctic environments, or desert environments.

SUMMARY OF THE INVENTION

In one or more embodiments, a swing adsorption system is described that includes a rotary valve assembly; a plurality of reciprocating valve assemblies and a plurality of adsorbent bed units. Each of the plurality of reciprocating valve assemblies is in fluid communication with the rotary valve assembly via a dedicated conduit; and each of the plurality of adsorbent bed units is in fluid communication with the rotary valve assembly via one of the plurality of reciprocating valve assemblies. The system may also include at least one bellows coupled to the conduit disposed between the rotary valve assembly and the one of the plurality of reciprocating valve assemblies, wherein the at least one bellows is configured to adsorb thermal expansion and contraction of the conduit. Each of the reciprocating valve assemblies may communicate with one of a plurality of apertures in the rotary valve assembly. Further, at least one of the plurality of adsorbent bed units may have a reciprocating valve assembly that is dedicated for each stream that passes through the adsorbent bed unit as part of the adsorption cycle.

Other applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

The rotary valve assembly may be disposed within a central housing, which is configured to support the rotary valve assembly, the plurality of reciprocating valve assemblies and the plurality of adsorbent bed units. Further, each of the plurality of adsorbent bed units may be disposed substantially equidistantly from the central housing in a radial orientation. In certain embodiments, a first portion of the plurality of adsorbent bed units may be disposed equidistantly from the central housing by a first radii and a second portion of the plurality of adsorbent bed units may be disposed equidistantly from the central housing by a second radii.

The swing adsorption system may also include additional rotary valve assemblies. For example, the system may include a second rotary valve assembly and a second plurality of reciprocating valve assemblies, wherein each of the second plurality of reciprocating valve assemblies is in fluid communication with the second rotary valve assembly via a dedicated conduit and is in fluid communication with one of plurality of adsorbent bed units. In this system, the rotary valve assembly and the second rotary valve assembly are each associated with different streams in the system. Alternatively, the system may include a second rotary valve assembly; and a second plurality of reciprocating valve assemblies, wherein each of the second plurality of reciprocating valve assemblies is in fluid communication with the second rotary valve assembly via a dedicated conduit and is in fluid communication with one of a second plurality of adsorbent bed units. The second rotary valve assembly may be disposed on a first tier and the rotary valve assembly is disposed on a second tier, wherein the second tier is at a higher elevation relative to the first tier.

In certain embodiments, the rotary valve assembly may include additional components. For example, the rotary valve assembly may include a drive assembly configured to rotate an aperture plate to provide the fluid to one or more of the plurality of reciprocating valve assemblies. The drive assembly may include a drive shaft, a sealed collar and wherein the plurality of transmitter magnets are disposed along the drive shaft and configured to rotate with the drive shaft. Also, rotary valve assembly may include at least one transmitter magnet and a plurality of receiver magnets, wherein at least one of the plurality of receiver magnets is associated with one of the plurality of reciprocating valve assemblies and is in communication with a sensor configured to transmit a signal to one of the plurality of reciprocating valve assemblies.

In one or more embodiments, a method of processing a feed stream is described. The method includes a) passing a feed stream through a rotary valve assembly; b) passing the feed stream from the rotary valve assembly to one of a plurality of reciprocating valve assemblies based on the alignment of an aperture plate in the rotary valve assembly; c) processing the feed stream from the one of a plurality of reciprocating valve assemblies in an adsorbent bed unit dedicated to the one of a plurality of reciprocating valve assemblies to separate one or more contaminants from the feed stream to form a product stream; d) conducting away from the adsorbent bed unit the product stream; e) rotating one or more components in the rotary valve assembly to a subsequent alignment, wherein the subsequent alignment stops fluid flow to the one of a plurality of reciprocating valve assemblies from the rotary valve assembly and permits fluid flow to a subsequent one of the plurality of reciprocating valve assemblies; f) processing the feed stream from the subsequent one of a plurality of reciprocating valve assemblies in a subsequent adsorbent bed unit dedicated to the subsequent one of a plurality of reciprocating valve assemblies to separate one or more contaminants from the feed stream to form a product stream; and g) conducting away from the subsequent adsorbent bed unit the product stream; and h) repeating the steps a-g for at least one additional cycle. The method may also include rotating at least one transmitter magnet relative to a plurality of receiver magnets, wherein at least one of the plurality of receiver magnets is associated with one of the plurality of reciprocating valve assemblies and is in communication with a sensor configured to transmit a signal to one of the plurality of reciprocating valve assemblies.

DETAILED DESCRIPTION OF THE INVENTION

Figure 1:
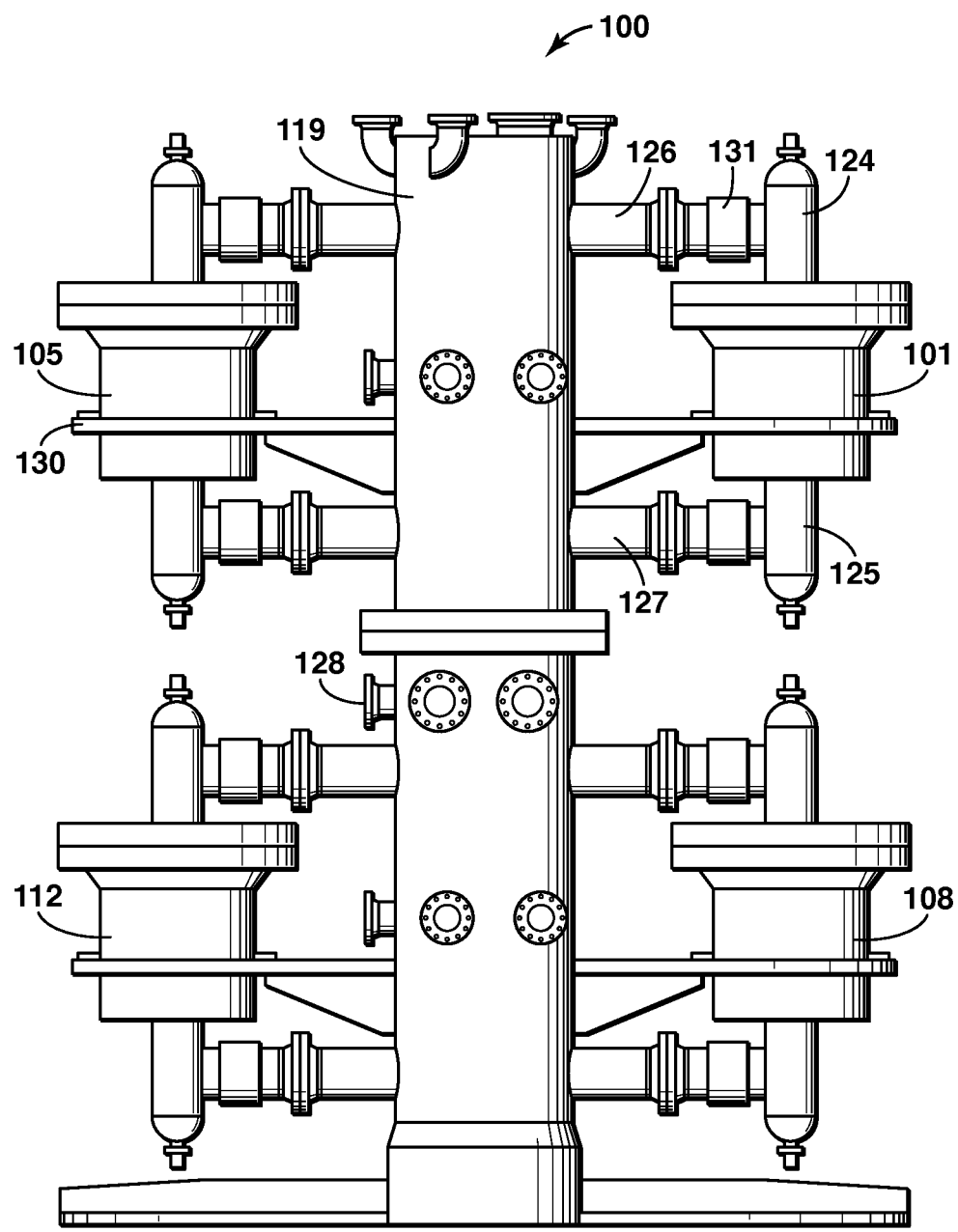
FIG. 1 is an exemplary illustration of an elevation view of a portion of a fourteen adsorbent bed arrangement.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The present techniques relate to a mechanical configuration, which distributes multiple gaseous streams through a plurality of adsorbent bed assemblies. The multi-adsorbent bed configuration is deployed in a self-supporting compact arrangement, which transfers gaseous streams bi-directionally through given adsorbent beds and a series arrangement of one or more poppet valves and one or more rotary valves.

Embodiments of the present techniques may be utilized for gas separation systems, particularly to rotary pressure swing adsorption systems. Rotary pressure swing adsorption system can include one or more rotary valve assemblies along with reciprocating valve assemblies, such as poppet valve assemblies. The present techniques can be used for any type of swing adsorption process. Non-limiting swing adsorption processes for which the present invention can be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption.

Conventional swing adsorption processes typically take place in a system containing a plurality of adsorbent beds, each undergoing different steps in an adsorption cycle that usually includes an adsorption step, one or more depressurization/equalization steps, one or more blow-down/desorption steps, and one or more re-pressurization steps. This other systems include void spaces in the various conduits and along the flow path that has to be sweep or otherwise managed. Gas trapped in the void volume or dead space of a system may degrade the performance of the swing adsorption system, such as reducing product purity or product recovery. Additional cycle steps to sweep the dead space may also be required without other means to manage the dead space.

The present techniques involve the use of a reciprocating valve assembly along with a rotary valve assembly, which are associated with each stream being provided to each of the adsorbent beds. Accordingly, the flow of fluid to and from each bed is controlled by a poppet valve assembly along with a rotary valve assembly coupled through a dedicated conduit. By reducing the void or dead volume, the configuration may enhance operation of the system.

This configuration provides various features that are enhancements to conventional swing adsorption systems. For example, a first feature is that the configuration utilizes rotary valve assemblies in a series configuration with poppet valve assemblies, which enhances the operation of the system. That is, the adsorbent bed has at least one-poppet valve assembly, but can have more than one poppet valve assembly on either end of the adsorbent bed closure plates, which is associated with different streams. In this manner, the stream may travel between the reciprocating valve assembly and the rotary valve assembly through a fixed conduit. By utilizing a reciprocating valve assembly and the rotary valve assembly in series together, the void space within the conduit to the adsorbent bed and the rotary valve assembly are efficiently managed, as this conduit may be utilize for this stream as part of the process. Accordingly, the time duration for the transfer of subsequent gaseous streams is limited and directed by the predetermined adsorption cycle. As a result, the mixing of various streams does not occur, thereby enhancing product purity and product recovery. Further, purge steps may not be required to sweep the dead space or the flow rate of the purge stream may be reduced, thereby improving the efficiency of the system.

A second feature is enhanced coordination of the activation mechanism for the reciprocating valve assemblies, which may be managed via the rotary valve assembly. That is, the proposed activation mechanism involves opening or closing reciprocating valve assemblies based on several predetermined physical locations on the rotary valve assembly itself. The proposed configuration utilizes a traveling magnet utilized as a transmitter location, which is aligned to a fixed magnet assigned at a receiving location. A generated flux signal between the magnets activates a specified mechanized driver of a given reciprocating valve assembly for a specified duration. The generation and reading the change in a magnetic flux signal utilizes the Hall Effect, which may be utilized to enhance the operation of the cycle. As such, the proposed mechanism provides a reliable and repeatable means of replicating precise coordination between the valves for the swing adsorption process.

A third feature is that this configuration provides a compact arrangement and provides a reliable means of transferring a continuous gaseous stream through a plurality of fixed adsorbent beds. In this configuration, one or more rotary valve assemblies are concentrically located in a cylindrical housing, which is positioned at a substantially equal distance to each of the adsorbent beds along with the associated reciprocating valve assemblies (e.g., poppet valve assemblies). The cylindrical housing further provides support to the plurality of adsorbent beds, conduits and valves in a multi-tier level arrangement, which can be expanded to accommodate additional adsorbent beds within the horizontal footprint. Further, the configuration involves a mechanical integration of specific hardware that can be fabricated and assembled in a controlled shop environment. The modular nature of this configuration provides various commercial advantages and cost saving incentives to lessen field assembly time and testing. The present techniques may be further understood with reference to the figures below.

FIG. 1 is an exemplary illustration of a partial elevation view of a portion of a fourteen adsorbent bed arrangement. While this exemplary illustration utilizes a partial view of the fourteen adsorbent bed arrangement, it should be appreciated that the present techniques may broadly relate to adsorbent bed configurations with two or more adsorbent bed assemblies. In FIG. 1, the system 100 includes various adsorbent bed units 101, 105, 108 and 112 disposed around a central housing 119 having a cylindrical shape and in a multiple tier configuration. Each of the adsorbent bed units are in fluid communication with the central housing 119 via conduits and include an adsorbent bed to selectively remove one or more contaminants from a feed stream. For simplicity, the adsorbent bed units 101, 105, 108 and 112 are shown in this view along with conduits 126 and 127, which may be utilized for a feed stream and product stream. However, it should be appreciated that additional fixed conduits along with reciprocating valve assembly and rotary valve assembly pairs may be utilized for different streams, such as purge streams, blow-down streams, depressurization streams and re-pressurization streams.

To manage the flow of streams in the system, a rotary valve assembly may be concentrically positioned in the central housing 119. The central housing 119 provides a central location for the rotary valve assembly to be positioned with respect to the adsorbent bed units. Various streams may be provided to the system 100 via a range of process manifold connection nozzles 128 for usage in the steps of the cycle and deployed around the central cylindrical housing 119. These process streams may include gas feed streams, depressurization streams, purge streams, re-pressurization streams and the like.

The rotary valve assembly may be utilized to provide specific streams from conduits or manifolds in the central housing 119 to the respective adsorbent bed units, such as adsorbent bed units 101, 105, 108 and 112. Rotary valve assemblies are well known in the art and provide an efficient way of consolidating the multiple valves utilized for repetitive chemical processing cycles in a single vessel. Rotary valve assemblies are comprised of a stator and a rotor that is rotational about its axis relative to the stator. Both stator and rotor contain suitable sized location ports that function as multiple valves as a result of the rotation of the rotor. Via this rotation, the ports in the rotor come into and out of alignment with the ports of the stator, thus opening and closing the ports to fluid flow, and thereby serving as valves. The rotors and stators may comprise a plurality of circular ports located around the port pitch circle of the rotor and stator and/or may include multiple ports distributed around different tracks (e.g., additional port pitches) in other configurations. Further multiple adsorbent beds may be associated by a single rotor/stator pair and the rotor and stator may operate at different speeds of rotation. Exemplary rotary valve assemblies for use in swing adsorption processes can be found in U.S. Pat. Nos. 6,311,719 and 7,819,948 and U.S. Patent Application Nos. 2010/0059701 and 2010/0089241, and U.S. Patent Application Ser. No. 61/448,123.

To manage the flow from the rotary valve assembly to the adsorbent bed units via conduits, one or more reciprocating valve assemblies may also be utilized to enhance the process. As an example, the adsorbent bed unit 101 has at least one feed reciprocating valve assembly, such as reciprocating valve assembly 124, located on the upper closure plate of the adsorbent bed unit 101. This reciprocating valve assembly 124 is disposed in the fluid flow path between the conduit 126 and adsorbent bed within the adsorbent bed unit 101 to prevent or permit fluid flow. Also, the adsorbent bed unit 101 has at least one product reciprocating valve assembly, such as reciprocating valve assembly 125, located on the lower closure plate of the adsorbent bed unit 101. This reciprocating valve assembly 125 is disposed in the fluid flow path between the conduit 127 and adsorbent bed within the adsorbent bed unit 101 to prevent or permit fluid flow.

The reciprocating valve assembly may include a poppet valve assembly. A poppet valve assembly includes a two-way normally closed valve and a two-way normally open valve. In the first, a stem impels the poppet from its seat to open up the amount of allowable flow. In the latter, a stem constricts the course of flow by pushing the poppet back into its seat. The stem of a poppet valve assembly is typically powered by one of any number of actuators that vary with different types of poppet valves. Some are automatic, while others require manual activation. As an example, in the closed position, the poppet valve head and valve body engage to prevent fluid flow through the opening between the valve body and a location external to the valve body. However, in the open position, the stem and poppet valve head are capable of movement (e.g., axial movement or movement along a defined path) to provide a fluid flow path through the port between the valve body and a location external to the valve body. Certain types of poppet valves involve the use of a piston chamber, which applies pressure to the stem, in turn applying pressure to the poppet. Still other designs utilize a solenoid coil—known as a poppet solenoid valve—which employs a tightly-wound spiral to exert force onto the stem.

To support the adsorbent bed units and associated components, various support structures may be utilized that provide structural support and managing the associated conduits and valves utilized in the system 100. The structural support is provided by support arms, such as support arm 130, which are permanently fixed to the central housing 119. The support arms provide an annular support ring and location for threaded fasteners between respective support members on the adsorbent bed units. These components may also be welded together.

Also connected to the central housing 119 are various conduits, which may be securely connected to the central housing 119 via a pipe flange. For example, conduits 126 and 127 are fixed between the center housing 119 and the reciprocating valve assembly 124 and 125 (which are associated with adsorbent bed unit 101). These conduits provide a fluid communication path between the rotary valve assembly and the reciprocating valve assembly, which is described further below.

To provide additional flexibility, the system 100 may include expansion bellows disposed between a conduit and the respective reciprocating valve assembly. As an example, expansion bellows 131 is disposed between the conduit 126 and reciprocating valve assembly 124. The expansion bellows provides a robust mechanical connection, which allows for thermal expansion and contraction (e.g., movement) of each respective hardware (e.g., conduits) in the system.

Beneficially, this system provides enhancements to the operation of a process by providing a compact configuration and providing a more efficient management of the streams (e.g., the void space). As an example, if a feed stream is provided from the rotary valve assembly through the conduit 126 to the reciprocating valve assembly 124, the reciprocating valve assembly 124 may close to limit the flow of the feed stream into the adsorbent bed of adsorbent bed unit 101. The feed stream within the conduit 126 does not have to be displaced, as it can remain within the conduit 126 until the next step in the cycle utilizes the feed stream. In this manner, the system lessens the void space and the amount of streams that have to be managed between steps.

Further, the system 100 provides a compact arrangement of adsorbent bed units with centralized control of the flow through the system. In particular, the configuration provides flexibility in the components utilized, fabrication and assembly of the system in a controlled environment for fabrication, and testing and inspection opportunities before transport and after transport to the field location.

Figure 2:
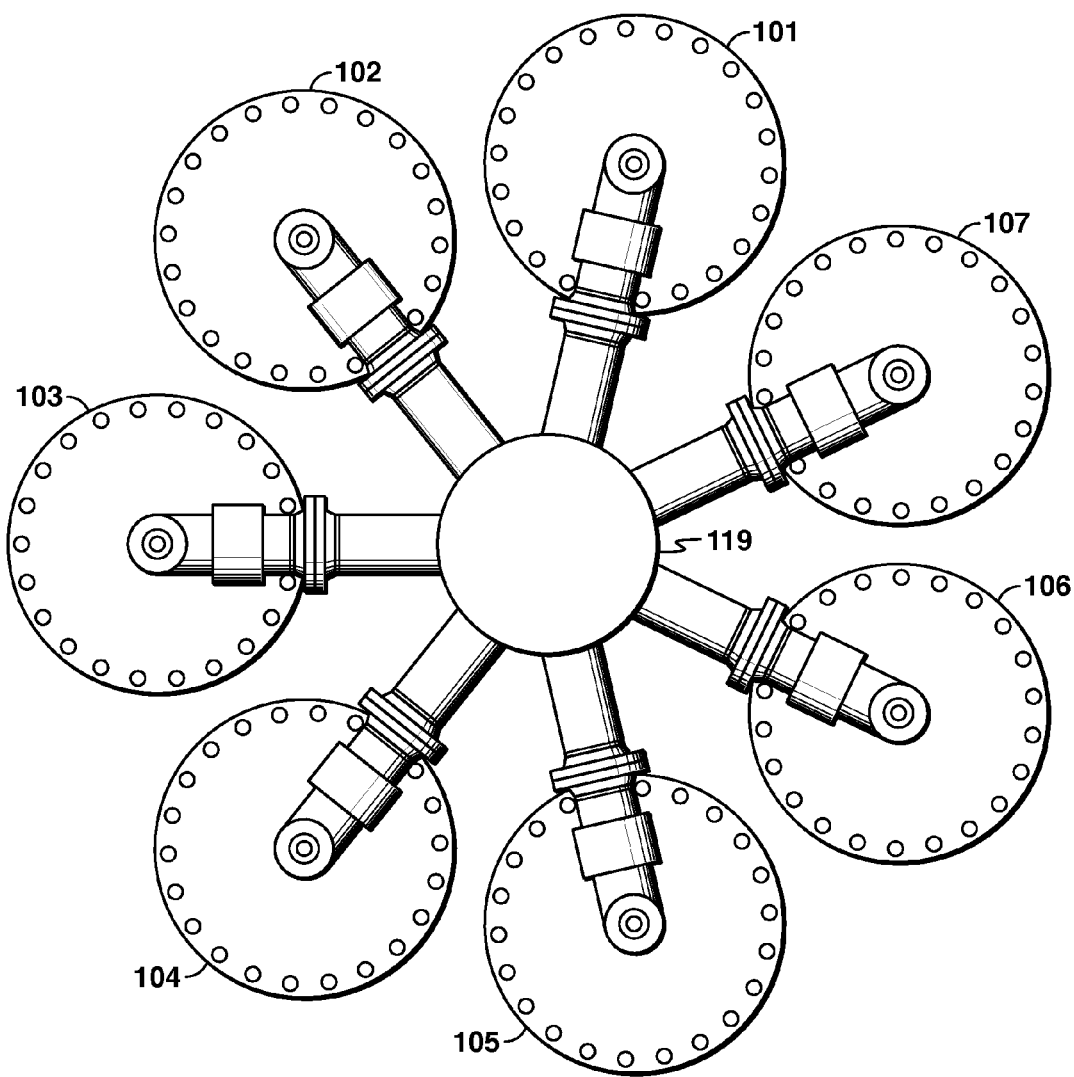
FIG. 2 is an exemplary illustration of the plan view of one-tier level of the configuration of FIG. 1 having seven-adsorbent beds equally deployed around the central housing.

FIG. 2 is an exemplary illustration of the plan view of one-tier level having seven adsorbent bed units equally deployed around the central housing. In this system, the different adsorbent bed units 101 to 107 are substantially symmetrically disposed around the central housing 119. This compact swing adsorption system has one or more rotary valve assemblies disposed in the concentric location of the central housing, which control the flow of streams from sources into the adsorbent bed units. In this embodiment, the adsorbent bed units are equidistantly positioned around the central housing 119. The central housing 119 further acts as a means of supporting a plurality of such adsorbent bed assemblies, conduits and valves in a multi-tier level arrangement. Gaseous streams are transferred through a given adsorbent bed by way of both the central rotary valve and one or more reciprocating valves located on the heads of the adsorbent bed units. The gaseous stream has bi-directional travel between the ports of either of the reciprocating valve assembly or rotary valve assembly through a fixed conduit. The transfer duration of subsequent gaseous streams is limited and directed by the predetermined adsorption cycle.

Figure 3:
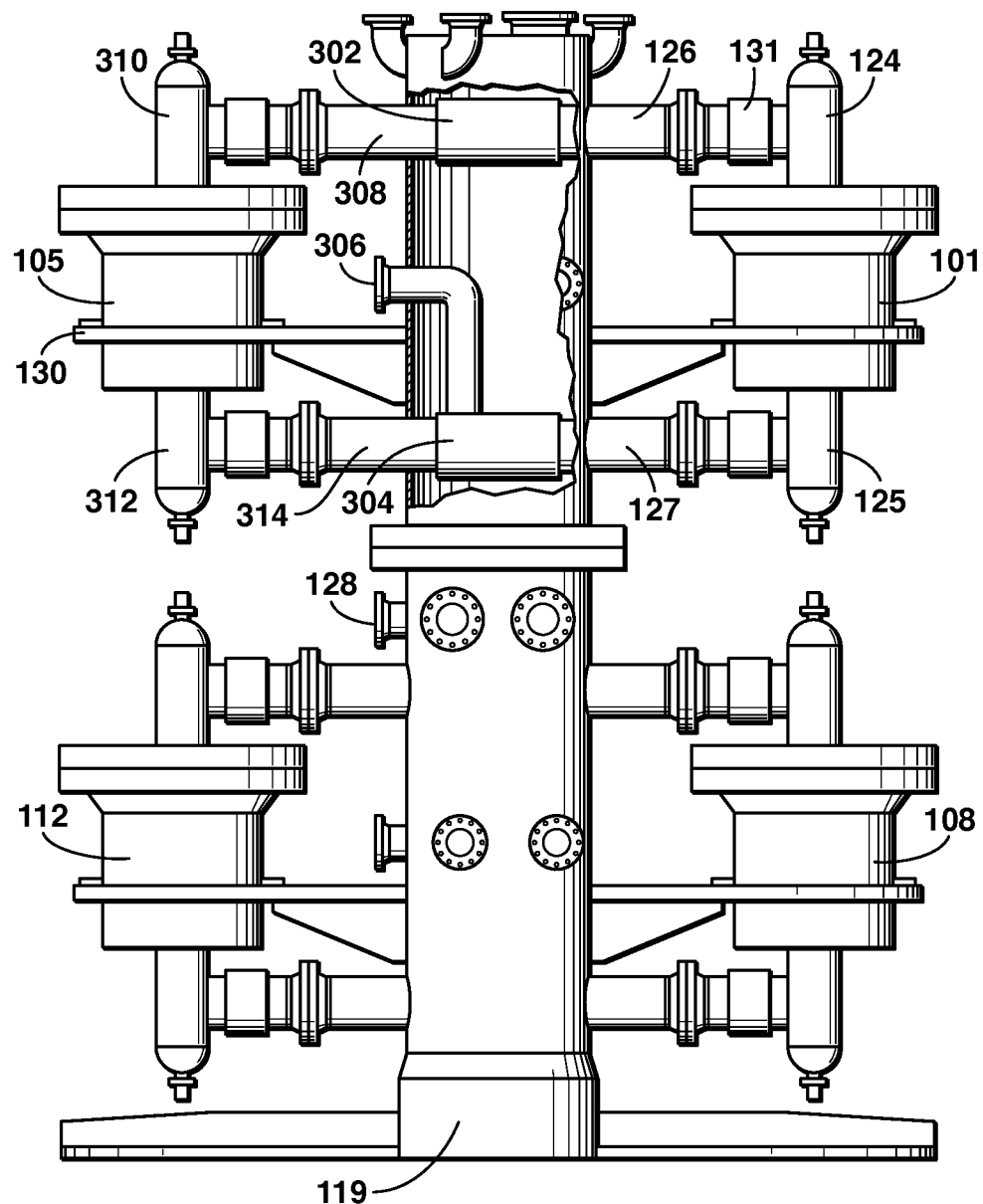
FIG. 3 is an exemplary illustration of the portion of the fourteen adsorbent bed arrangement showing the rotary valve assemblies.

FIG. 3 is an exemplary illustration of the system of FIG. 1 with a view being provided of the plurality of rotary valve assemblies in the central housing. FIG. 3 includes various components described above in FIG. 1, which include the same reference numerals in this illustration. However, in this illustration, a portion of the central housing 119 is removed to expose the two of the rotary valve assemblies 302 and 304 associated with the adsorbent bed units 101 and 105. It should be appreciated that one or more embodiments of the present invention broadly relates to having one or more rotary valve assemblies, which may be associated with each stream provided to at least a portion of the adsorbent bed units.

In this FIG. 3, two rotary valve assemblies 302 and 304 are disposed within the central housing 119. These rotary valve assemblies 302 and 304 are in fluid communication with the different adsorbent beds associated with the upper tier in this system, which are represented by adsorbent beds 101 and 105. Each of these rotary valve assemblies 302 and 304 are coupled to dedicated conduits that are each attached to a reciprocating valve assembly for each of the adsorbent bed units. The central housing 119 provides a central location for housing of the different rotary valve assemblies, such as rotary valve assemblies 302 and 304, the conduits associated with the different streams being passed through the rotary valves and any associated equipment. The associated equipment may include the drive means or drive assembly for the rotary valve assemblies, which may include a concentric rotation drive assembly (not shown), such as a motor. The radial distance between adsorbent bed unit and reciprocating valve to the port of the rotary valve may preferably be substantially equal in distance for each of the streams.

As an example, an adsorption cycle may include various streams that pass through an adsorbent bed unit. The steps of a cycle may include an adsorption step, one or more depressurization/desorption steps, one or more purge steps, one or more blow-down steps, and one or more re-pressurization steps. For the adsorption step, a feed stream may be passed to the adsorbent bed unit to adsorb contaminants into the adsorbent bed and pass the remaining fluid as a product stream, which is conducted away from the adsorbent bed unit. In this example, the feed stream may be passed to the rotary valve assembly 302 via conduit. This feed stream may then be passed to one or more of the adsorbent bed units, such as adsorbent bed unit 101 via conduit 126 and reciprocating valve assembly 124 and adsorbent bed unit 105 via conduit 308 and reciprocating valve assembly 310. The feed stream may be passed to the rotary valve assembly 302 via conduit. In a similar manner, the resulting product stream may then be passed to the rotary valve assembly 304 from one or more of the adsorbent bed units, such as adsorbent bed unit 101 via conduit 127 and reciprocating valve assembly 125 and adsorbent bed unit 105 via conduit 314 and reciprocating valve assembly 312, and conducted away from the system via conduit 306. Each of these flow paths may be dedicated to one stream, which results in the fluid within the conduit not having to be purged or removed. That is, the fluid within the conduit may be utilized in the subsequent cycle step. Also, while not shown, other streams may pass through the adsorbent beds with similar conduit and valve assembly pairing configurations.

To manage the operation of the valve assemblies, the system may also include a method of coordinating the activation mechanism of the reciprocating valve assemblies to either open or close at several predetermined physical locations on the rotary valve assembly itself. This method of activation mechanism may provide a reliable and repeatable means of replicating precise operable coordination between the open or closed ports of the respective valves for an adsorption cycle. To provide this coordination, a traveling magnet maybe assigned at a transmitter location, which is aligned to a fixed magnet assigned at a receiving location. A generated flux signal between the magnets may activate a specified mechanized driver of a given reciprocating valve for a specified duration. One method of generating and measuring the change in a magnetic flux signal is scientifically known as the Hall Effect. The use of this method is described further below in FIGS. 4A and 4B.

Figure 4A:
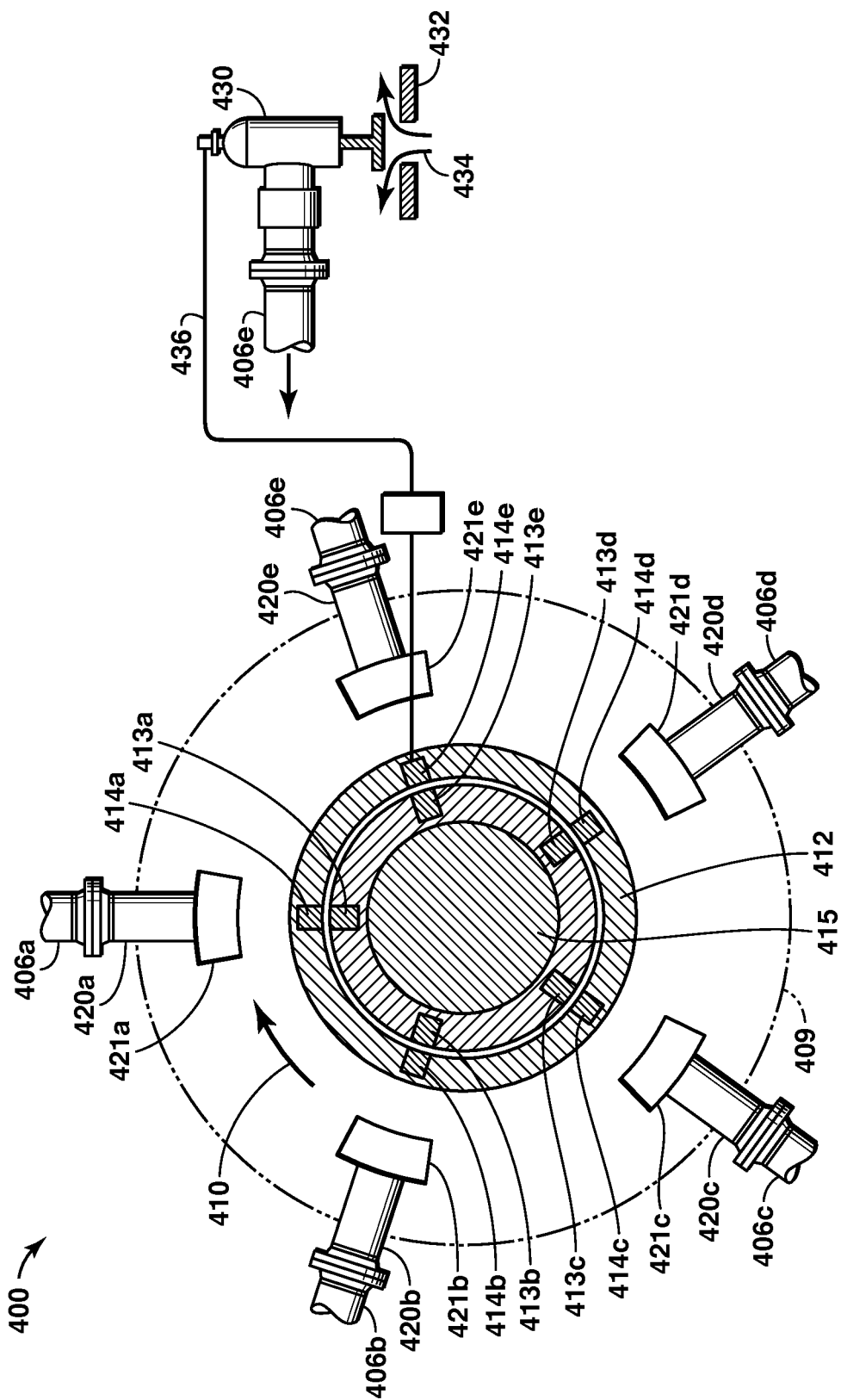
FIGS. 4A and 4B are illustrations showing the exemplary magnetic transmitter and sensing device that may be utilized in accordance with an embodiment of the present techniques.
Figure 4B:
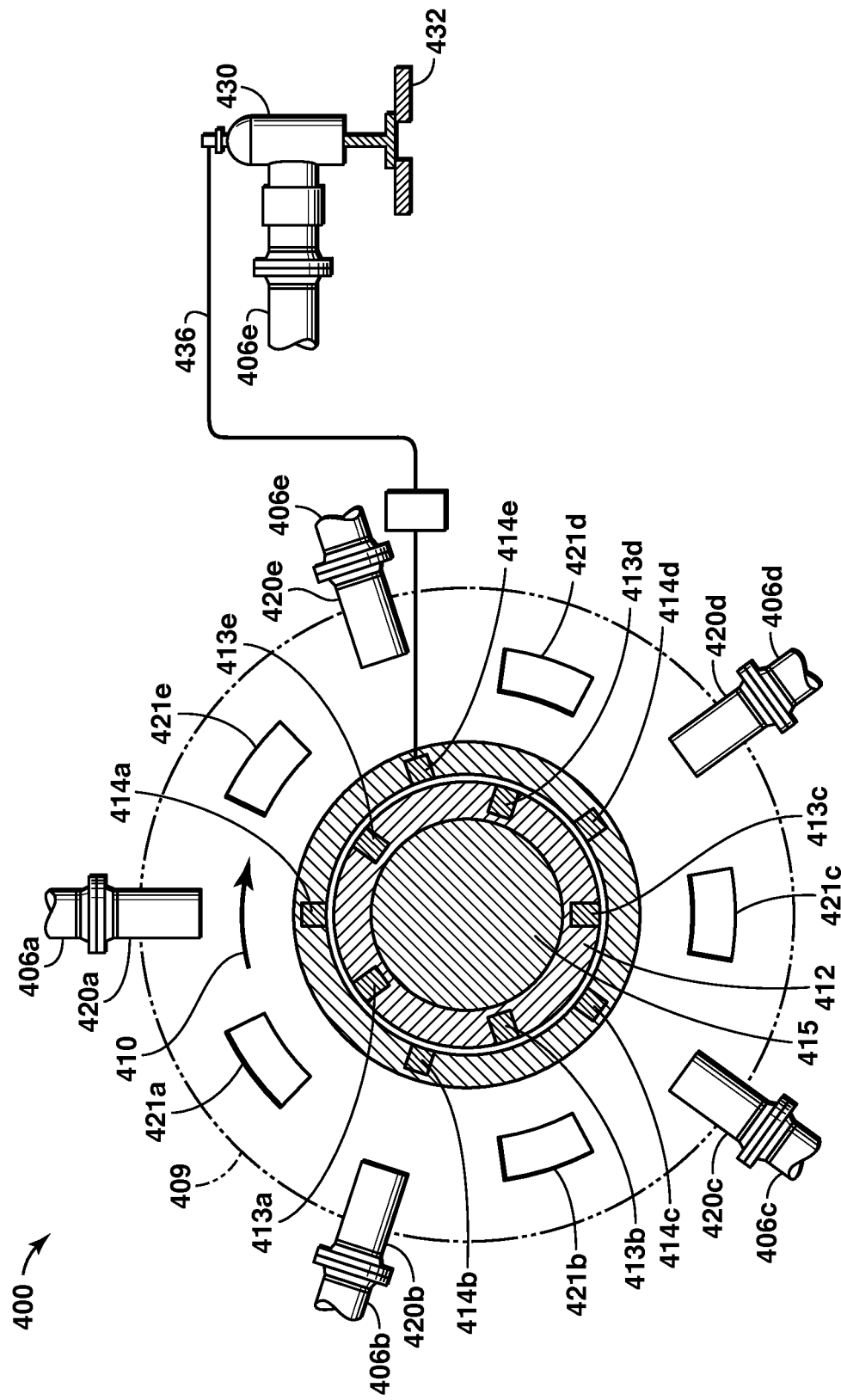

FIGS. 4A and 4B are illustrations showing the placement of the magnetic transmitter and sensing device in conjunction to the traveling and fixed apertures. The illustration further shows the interface relationship between the reciprocating valve assembly and rotary valve assembly. Specifically, these FIGS. 4A and 4B relate to a configuration 400 and method for consistently timing the operation of the reciprocating valve assemblies based on the movement of the rotary valve assembly. The rotary valve assembly is configured to align multiple gaseous ports and the associated conduits 406a-406e by continually moving traveling apertures 421a-421e alongside fixed apertures 420a-420e within a rotary valve housing 409. The developed rotational velocity of the rotary valve assembly 400 remains at a constant speed throughout the adsorption cycle. The gaseous cycle sequence continually communicates to a plurality of traveling apertures 421a-421e for simultaneously transferring multiple gaseous streams. The reciprocating valve assemblies should communicate with a given one of the traveling rotary valve apertures 421a-421e based on the rotation velocity and the sequence for the adsorption cycle.

To manage the fluid flow through the apertures 421a-421e, the system utilizes a reciprocating valve activation system based on the Hall Effect principle to energize the reciprocating valve assemblies without relying on mechanical components. In this system, a collar 412 encompassing the rotary valve concentric drive shaft 415 has a plurality of radial deployed magnets 413a-413e, which serve as the transmitters and may be referred to as transmitter magnets. A plurality of radial deployed magnets 414a-414e serve as the receivers, which may be referred to as receiving magnets. The annular space between the sets of magnets 413a-413e and 414a-414e develops the flux generation source. The sets of magnets 413a-413e and 414a-414e are preferably coordinated with the traveling aperture portals 421a-421e where the magnets 413a-413e and 414a-414e are then circuit aligned with each reciprocating valve 430. One or more sensors (not shown) may be utilized to measure the flux and provide an indication or signal to the poppet valve assembly associated with one or more of the magnets (e.g., one sensor associated with one of the receiver magnets 414a-414e and coupled via a line to one of the reciprocating valve assemblies). An absolute point may be associated with the transmitter magnets 413a-413e aligning with the receiver magnets 414a-414e, as shown in FIG. 4A.

In one or more embodiments, it should be appreciated that the system may include different numbers of transmitter magnets. For example, the system may include a single transmitter magnet that is utilized to active the different receiver magnets, which are each associated with one of the reciprocating valve assemblies. In another example, the system may include two transmitter magnets utilized to activate the different receiver magnets. which are each associated with one of the reciprocating valve assemblies. These transmitter magnets may be symmetrically offset from each other along the drive shaft to maintain balance for the system. Also, the configuration of magnets may be adjusted based on the cycle being used for the process, which may include more receiver magnets than transmitter magnets in certain configurations. Further, the system may include magnets of different sizes based on the length of activation for a reciprocating valve assembly associated with the magnet.

This present techniques provide a reliable method of energizing the reciprocating valves, via the activation device by recognizing a flux signal. That is, by passing a traveling magnet 413a-413e over a fixed magnet 414a-414e, a signal is transmitted via line 436 to the reciprocating valve 430 to permit flow from the adsorbent bed unit 432, as shown by the arrows 434. The simplicity of utilizing this activation mechanism, which is based on the Hall Effect, avoids the usage of unreliable mechanical or metallic switching devices, and as a result enhances operation and reliability. This removes the potential problems associated with such mechanical or metallic devices, which are prone to continuous field adjustments, maintenance and possible malfunction.

FIG. 4B includes the same reference characters, but the magnets 413a-413e and apertures 421a-421e are rotated with the reciprocating valve assembly in the closed position (e.g., hindering flow of fluids from the rotary valve assembly to the adsorbent bed unit 432.

Figure 5:
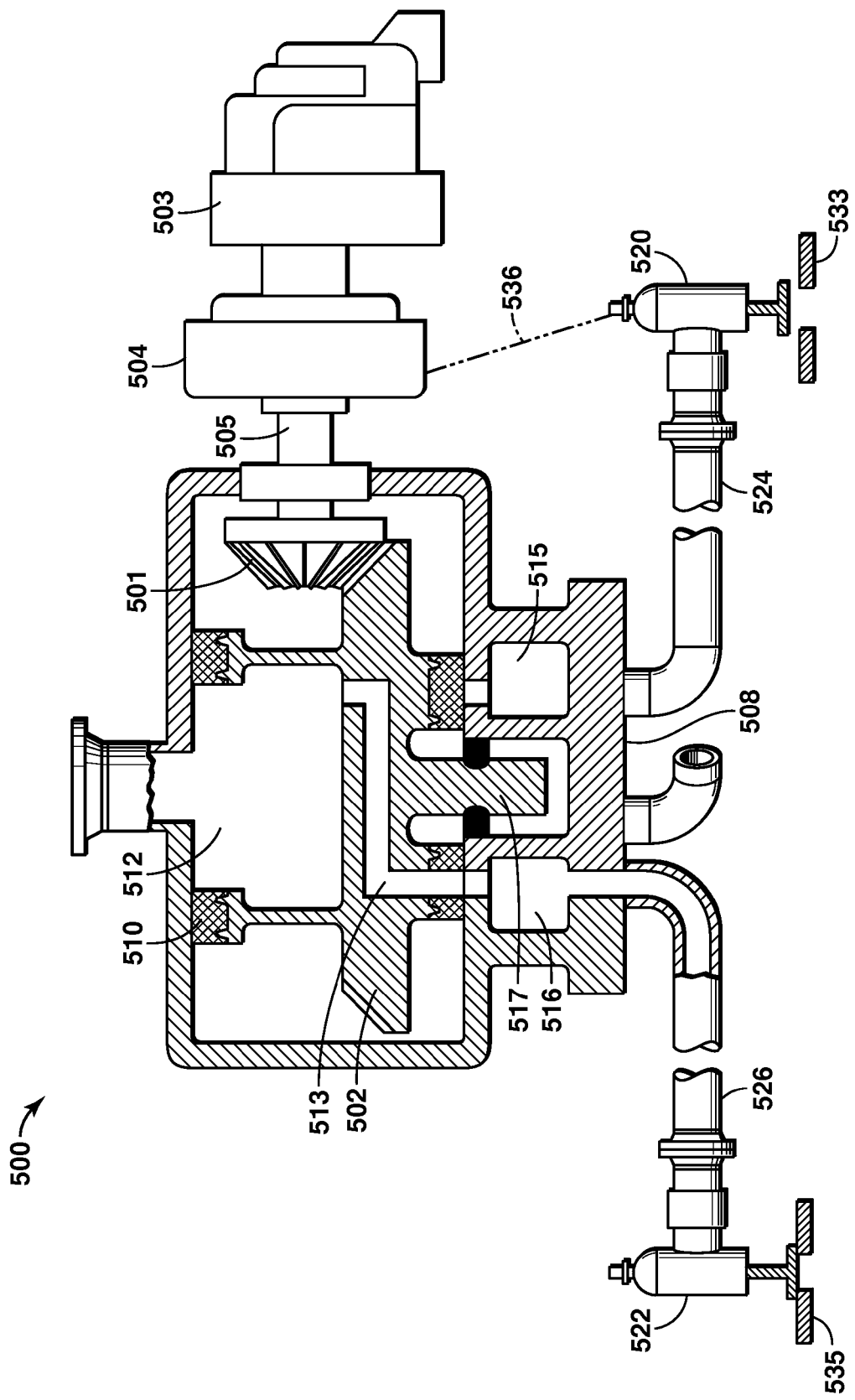
FIG. 5 is an exemplary illustration of a rotating port valve and associated conduits in accordance with an embodiment of the present techniques.

FIG. 5 is an exemplary illustration of a rotating port valve and associated conduits in accordance with an embodiment of the present techniques. This configuration 500 has a rotary valve assembly coupled to two reciprocating valves assemblies 520 and 522 via conduits 524 and 526. The rotary valve assembly is utilized to pass fluids to one or more of the respective adsorbent bed units, such as adsorbent bed units 533 and 535.

The rotary valve assembly includes a bevel gear 501 that rotates an aperture plate 502. The bevel gear may be associated with a drive assembly that is configured to rotate an aperture plate 502 to provide the fluid to one or more of the plurality of reciprocating valve assemblies, which is rotated by a drive motor 503 having a hall effect device 504 integrated with the drive shaft 505. The drive assembly may also include a sealed collar. The bevel gear 501 may be a lubricated bevel gear within the rotary valve assembly. As part of the gear head assembly, the hall effect device 504 may include the magnetics that are utilized to activate the different reciprocating valve assemblies 520 and/or 522. This operation may be similar to the discussion above in FIGS. 4A and 4B, which may include a signal or indication being transmitted via line 536 (as shown for reciprocating valve 520). The rotary valve assembly may also include a shaft bearing and seal assembly 517 to further manage the operation of the rotary valve assembly.

To operate, the rotary valve assembly rotates to provide different passages for fluid flow between a primary chamber 512 and partitioned chambers. The number of partition chambers may include any number of partition chambers based on the different adsorbent bed units in fluid communication with this rotary valve assembly. In this configuration, partition chambers 515 and 516 are shown for simplicity. As an example, the aperture plate 502 is coupled to a bypass seal 510 that is disposed between the aperture plate 502 and the body 508. This aperture plate 502, bypass seal 510 and body 508 form a primary chamber 512, which may be used to form a defined volume or sealed plenum for storing fluid, such as the feed gas stream or the product stream. The primary chamber 512 is coupled to a header or conduit to provide a fluid to the rotary valve assembly or remove a fluid from the rotary valve assembly. Based on the alignment of the aperture plate 502, different channels may provide fluid flow paths to the different conduits. In particular, a channel 513 is formed in this configuration between the primary chamber 512 and partitioned chamber 516. The fluid may then be transferred via conduit 526 to the reciprocating valve assembly 522 and the associated adsorbent bed unit 535. It should be noted that in this configuration, the partition chamber 515 is sealed and not in fluid communication with the primary chamber 512, while it is in fluid communication with the reciprocating valve assembly 520 via conduit 524.

Beneficially, this system enhances operation of the cycle of a swing adsorption process and may be utilized to lessen the void space within the conduits. Further, based on the use of the gear, the aperture plate is easier to balance and as a result sealing the rotary valve assembly is enhanced and maintainable.

In one or more embodiments, the system may include one rotary valve assembly and one reciprocating valve assembly for each adsorption bed unit. That is, while the rotary valve assembly may be utilized to provide a single feed stream as noted above, the rotary valve assembly may be utilized to provide multiple streams to the adsorbent bed unit via the same reciprocating valve assembly. These streams may involve different steps within a cycle, such as a swing adsorption cycle.

In one or more embodiments, the rotary valve assembly may include one or more components that move relative to each other. For the moving components (e.g., rotor and stator), a seal interface may be deployed between any two relatively moving surfaces (e.g., rotor, stator, adsorbent bed, and the like). To provide this movement, a motor or other suitable movement or drive means may be utilized to rotate the moving components. For example, drive means may include belts, chains and/or gears to move the rotor and/or stator within the central housing.

Further, each of the different components may also be configured to rotate independently of each other to provide additional flexibility in the sequence of the system or to manage the streams within the cycle. As an example, each rotor (feed or product) can be operated at a fixed or constant speed, but may be different from the associated product rotor. Such fixed rotational speeds allow better control and mechanical set-up at faster rpms, particularly for rapid cycle swing adsorption processes. Such fixed rotational speeds also permit the use of just one motor to drive both rotors. Accordingly, in rotor valve assemblies noted above, the rotors preferably operate at fixed speeds. Operating at fixed speed means that a single motor driver (e.g., motive force) can be used for more than one rotor in the overall vessel holding all adsorbent beds (and logically for all rotors). The motor may include a step motor. This greatly reduces the overall equipment footprint, that is significant for many applications such as offshore or subsea/down-hole natural gas processing and $CO_2$ removal etc. Rotor speeds and ports/openings on each rotor/stator combination, which are of different sizes and shapes can be synchronized to deliver any chosen cycle.

Also, in one or more embodiments, the adsorption bed assembly may include an adsorbent bed that can be used for the separation of a target gas form a gaseous mixture. The adsorbent is usually comprised of an adsorbent material supported on a non-adsorbent support, or contactor. Non-limiting examples of the form of the adsorbent bed include beds of beaded or pelletized adsorbent particles or an adsorbent material on a structured contactor, such as a parallel channel contactor. Such contactors contain substantially parallel flow channels wherein 20 volume percent, preferably 15 volume percent or less of the open pore volume of the contactor, excluding the flow channels, is in pores greater than about 20 angstroms and less than 1 micron. A flow channel is taken to be that portion of the contactor in which gas flows, if a steady state pressure difference is applied between the point or place at which a feed stream enters the contactor and the point or place at which a product stream leaves the contactor. In a parallel channel contactor, the adsorbent is incorporated into the wall of the flow channel. Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multilayered spiral rolls, spiral wound adsorbent sheets, bundles of hollow fibers, as well as bundles of substantially parallel solid fibers. "Parallel channel contactors" are defined as a subset of adsorbent contactors comprising structured (engineered) adsorbents in which substantially parallel flow channels are incorporated into the adsorbent structure. Parallel flow channels are described in detail in United States Patent Publication Nos. 2008/0282892 and 2008/0282886, both of which herein incorporated by reference in their entirety. These flow channels may be formed by a variety of means and in addition to the adsorbent material, the adsorbent structure may contain items such as, but not limited to, support materials, heat sink materials, void reduction components, and heating/cooling passages.

Non-limiting examples of adsorbent materials that can be used with the rotary valve assembly of the present invention include high surface area (>10 m2/gm and preferably >75 m2/gm) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

In one or more embodiments, the swing adsorption process using the rotary valve assembly and the poppet valve assembly of the present techniques is rapidly cycled, in which case the processes are referred to as rapid cycle pressure swing adsorption (RCPSA), rapid cycle temperature swing adsorption (RCTSA), and rapid cycle partial pressure swing or displacement purge adsorption (RCPPSA). For RCPSA the total cycle times are typically less than 90 seconds, preferably less than 30 seconds, more preferably less than 15 seconds, and even more preferably less than 10 seconds. For RCTSA the total cycle times are typically less than 600 seconds, preferably less than 200 seconds, more preferably less than 100 seconds, and even more preferably less than 60 seconds. Conventional PSA cycle times are typically in excess of 2 to 4 minutes.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

Further, in one or more embodiments, the present techniques may broadly relate to adsorbent bed assemblies that can be deployed in a non-symmetrical orientation or having more than one radii. The different radius may be utilized based on the specific conduit or piping limitations, limitations on the height of the system, and/or other factors. The difference of the first radius and the second radius may be greater than 10%, greater than 15%, and/or greater than 20%. The difference of the first radius and the second radius is the absolute value of the first radius minus the second radius divided by smaller of the first radius or second radius). As one example, a first tier of adsorbent bed units may have a first radius from the central housing, while a second tier of adsorbent bed units may have a second radius from the central housing. As an alternative example, a first tier of adsorbent bed units may have a first portion of the adsorbent bed units having a first radius from the central housing, while a second portion of the adsorbent bed units may have a second radius from the central housing.

One or more of the following Concepts A-O may be utilized with the processes, apparatus, and systems, provided above, to prepare a desirable product stream while maintaining high hydrocarbon recovery:

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space can be reduced by filling the mesopores and macropores between the particles to reduce the open volume while allowing rapid gas transport throughout the adsorbent layer. This filling of the non-sweepable void space, which may be referred to as mesopore filling, is desired to reduce to acceptable levels the quantity of desired product, lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way would be by filling the void space with inert solids of smaller and smaller sizes, or by filling the void space with a replenishable liquid through which the desired gases rapidly diffuse (such as water, solvents, or oil). Preferably, the void space within the adsorbent wall is reduced to less than 40 volume percent (vol. %), preferably to less than 30 vol. %, more preferably to less than 20 vol. %, even more preferably to less than 10 vol. % and most preferably less than about 5 vol % of the open pore volume.;

Concept D: Choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety.

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to un-functionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4$+ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of H2S and CO2 from natural gas streams, an adsorbent material preferably is selective for $H_2S$ and $CO_2$ but has a low capacity for both methane and heavier hydrocarbons ($C_2$+). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., DCO2/DCH4) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., DN2/DCH4) is greater than 5, preferably greater than about 20, and more preferably greater than about 50 and even more preferably greater than 100. Resistance to fouling in swing adsorption processes during the removal of $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a macroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an H+(proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine (CH3N(C2H4OH)2), NNN'N"-tetrakis(2-hydroxyethyl)ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl) carboxamidines where lower alkyl is preferably C1-C6 alkyl, N-methyltetrahydropyrimidine (MTHP), 1,8-diazabicyclo[5.4.0]-undecene-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ where $R^1$, $R^2$, $R^3$ and $R^4$ are preferably lower alkyl (C1-C6) and R5 is preferably H or lower alkyl (C1-C6), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing H2S and CO2, from natural gas streams is cationic zeolites. Selectivity of these materials for H2S and CO2 depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing H2S and CO2 after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred.;

Concept E: depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as CO2; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent lined channels. This structure of the contactor provides the benefits of rapid adsorption kinetics through minimization of gas film resistance and high gas solid communication. A preferred adsorber design generates a sharp adsorption front.

It is preferred to have very rapid gas to adsorbent kinetics, i.e. the length through which the target species (e.g., a target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing a parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 5 microns for most applications. In the most limiting case of laminar gas flow, the very narrow channels limit the maximum diffusion distance for a trace species to no more than half (½) the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design.;

Concept N: A means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns. A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In one or more embodiments, it is advantageous to keep the ratio of non-adsorbing thermal mass in the adsorbent bed to adsorbent as low as possible. This ratio may be preferably less than 20, more preferably less than 10, and most preferred less than 5. In this manner, the sensible heat of the system that is swung in each cycle may be kept to a minimum.

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there may be no break-through of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this may allow more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits, while providing high hydrocarbon recovery as compared to conventional technology.

Additional embodiments are provided in the following paragraphs:

1. A swing adsorption system comprising:
    a rotary valve assembly;
    a plurality of reciprocating valve assemblies, wherein each of the plurality of reciprocating valve assemblies is in fluid communication with the rotary valve assembly via a dedicated conduit; and
    a plurality of adsorbent bed units, wherein each of the plurality of adsorbent bed units is in fluid communication with the rotary valve assembly via one of the plurality of reciprocating valve assemblies.
2. The swing adsorption system of paragraph 1, wherein the rotary valve assembly is disposed within a central housing.
3. The swing adsorption system of any one of paragraphs 1 to 2, wherein the central housing is configured to support the rotary valve assembly, the plurality of reciprocating valve assemblies and the plurality of adsorbent bed units
4. The swing adsorption system of any one of paragraphs 1 to 3, wherein each of the plurality of adsorbent bed units are disposed substantially equidistantly from the central housing in a radial orientation.
5. The swing adsorption system any one of paragraphs 1 to 3, wherein a first portion of the plurality of adsorbent bed units are disposed equidistantly from the central housing by a first radii and a second portion of the plurality of adsorbent bed units are disposed equidistantly from the central housing by a second radii.
6. The swing adsorption system of any one of paragraphs 1 to 5, further comprising at least one bellows is coupled to the conduit disposed between the rotary valve assembly and the one of the plurality of reciprocating valve assemblies, wherein the at least one bellows is configured to adsorb thermal expansion and contraction of the conduit.
7. The swing adsorption system of any one of paragraphs 1 to 6, wherein the each of the reciprocating valve assemblies communicates with one of a plurality of apertures in the rotary valve assembly.
8. The swing adsorption system of any one of paragraphs 1 to 7, wherein at least one of the plurality of adsorbent bed units has a reciprocating valve assembly that is dedicated for each stream that passes through the adsorbent bed unit as part of the adsorption cycle.
9. The swing adsorption system of any one of paragraphs 1 to 8, further comprising a second rotary valve assembly; and a second plurality of reciprocating valve assemblies, wherein each of the second plurality of reciprocating valve assemblies is in fluid communication with the second rotary valve assembly via a dedicated conduit and is in fluid communication with one of plurality of adsorbent bed units.
10. The swing adsorption system of paragraph 9, wherein the rotary valve assembly and the second rotary valve assembly are each associated with different streams in the system.
11. The swing adsorption system of any one of paragraphs 1 to 8, further comprising a second rotary valve assembly; and a second plurality of reciprocating valve assemblies, wherein each of the second plurality of reciprocating valve assemblies is in fluid communication with the second rotary valve assembly via a dedicated conduit and is in fluid communication with one of a second plurality of adsorbent bed units.
12. The swing adsorption system of paragraph 11, wherein the second rotary valve assembly is disposed on a first tier and the rotary valve assembly is disposed on a second tier, wherein the second tier is at a higher elevation relative to the first tier.
13. The swing adsorption system of any one of paragraphs 1 to 12, wherein the rotary valve assembly comprises a drive assembly configured to rotate an aperture plate to provide the fluid to one or more of the plurality of reciprocating valve assemblies.
14. The swing adsorption system of any one of paragraphs 1 to 13, wherein the rotary valve assembly comprises at least one transmitter magnet and a plurality of receiver magnets, wherein at least one of the plurality of receiver magnets is associated with one of the plurality of reciprocating valve assemblies and is in communication with a sensor configured to transmit a signal to one of the plurality of reciprocating valve assemblies.
15. The swing adsorption system of paragraph 13, wherein the drive assembly comprises a drive shaft, a sealed collar and wherein the plurality of transmitter magnets are disposed along the drive shaft and configured to rotate with the drive shaft.
16. A method of processing a feed stream comprising:
    a) passing a feed stream through a rotary valve assembly;
    b) passing the feed stream from the rotary valve assembly to one of a plurality of reciprocating valve assemblies based on the alignment of the rotary valve assembly (which may be an aperture plate);
    c) processing the feed stream from the one of a plurality of reciprocating valve assemblies in an adsorbent bed unit dedicated to the one of a plurality of reciprocating valve assemblies to separate one or more contaminants from the feed stream to form a product stream;
    d) conducting away from the adsorbent bed unit the product stream;
    e) rotating one or more components in the rotary valve assembly (e.g. the aperture plate) to a subsequent alignment, wherein the subsequent alignment stops fluid flow to the one of a plurality of reciprocating valve assemblies from the rotary valve assembly and permits fluid flow to a subsequent one of the plurality of reciprocating valve assemblies;
    f) processing the feed stream from the subsequent one of a plurality of reciprocating valve assemblies in a subsequent adsorbent bed unit dedicated to the subsequent one of a plurality of reciprocating valve assemblies to separate one or more contaminants from the feed stream to form a product stream; and
    g) conducting away from the subsequent adsorbent bed unit the product stream; and
    h) repeating the steps a-g for at least one additional cycle.

17. The method of paragraph 16, comprising: rotating at least one transmitter magnet relative to a plurality of receiver magnets, wherein at least one of the plurality of receiver magnets is associated with one of the plurality of reciprocating valve assemblies and is in communication with a sensor configured to transmit a signal to one of the plurality of reciprocating valve assemblies that actuates the one of the plurality of reciprocating valve assemblies.

In view of the many possible embodiments to which the principles of the disclosed invention may be applied, it should be recognized that the illustrative embodiments are only preferred examples of the invention and should not be taken as limiting the scope of the invention.

What is claimed is:

1. A swing adsorption system comprising:
    a rotary valve assembly;
        a plurality of reciprocating valve assemblies, wherein each of the plurality of reciprocating valve assemblies is in fluid communication with the rotary valve assembly via a dedicated conduit;
        a plurality of adsorbent bed units, wherein each of the plurality of adsorbent bed units is in fluid communication with the rotary valve assembly via one of the plurality of reciprocating valve assemblies; and
        a drive assembly configured to rotate an aperture plate to provide the fluid to one or more of the plurality of reciprocating valve assemblies.

2. The swing adsorption system of claim 1, wherein the rotary valve assembly is disposed within a central housing.

3. The swing adsorption system of claim 2, wherein the central housing is configured to support the rotary valve assembly, the plurality of reciprocating valve assemblies and the plurality of adsorbent bed units.

4. The swing adsorption system of claim 2, wherein each of the plurality of adsorbent bed units are disposed substantially equidistantly from the central housing in a radial orientation.

5. The swing adsorption system of claim 2, wherein a first portion of the plurality of adsorbent bed units are disposed equidistantly from the central housing by a first radii and a second portion of the plurality of adsorbent bed units are disposed equidistantly from the central housing by a second radii.

6. The swing adsorption system of claim 1, further comprising at least one bellows is coupled to the conduit disposed between the rotary valve assembly and the one of the plurality of reciprocating valve assemblies, wherein the at least one bellows is configured to adsorb thermal expansion and contraction of the conduit.

7. The swing adsorption system of claim 1, wherein each of the reciprocating valve assemblies communicates with one of a plurality of apertures in the rotary valve assembly.

8. The swing adsorption system of claim 1, wherein at least one of the plurality of adsorbent bed units has a reciprocating valve assembly that is dedicated for each stream that passes through the adsorbent bed unit as part of the adsorption cycle.

9. The swing adsorption system of claim 1, further comprising a second rotary valve assembly; and a second plurality of reciprocating valve assemblies, wherein each of the second plurality of reciprocating valve assemblies is in fluid communication with the second rotary valve assembly via a dedicated conduit and is in fluid communication with one of the plurality of adsorbent bed units.

10. The swing adsorption system of claim 9, wherein the rotary valve assembly and the second rotary valve assembly are each associated with different streams in the system.

11. The swing adsorption system of claim 1, further comprising a second rotary valve assembly; and a second plurality of reciprocating valve assemblies, wherein each of the second plurality of reciprocating valve assemblies is in fluid communication with the second rotary valve assembly via a dedicated conduit and is in fluid communication with one of a second plurality of adsorbent bed units.

12. The swing adsorption system of claim 11, wherein the second rotary valve assembly is disposed on a first tier and the rotary valve assembly is disposed on a second tier, wherein the second tier is at a higher elevation relative to the first tier.

13. The swing adsorption system of claim 1, wherein the rotary valve assembly comprises at least one transmitter magnet and a plurality of receiver magnets, wherein at least one of the plurality of receiver magnets is associated with one of the plurality of reciprocating valve assemblies and is in communication with a sensor configured to transmit a signal to one of the plurality of reciprocating valve assemblies.

14. The swing adsorption system of claim 13, wherein the drive assembly comprises a drive shaft, a sealed collar and wherein the plurality of transmitter magnets are disposed along the drive shaft and configured to rotate with the drive shaft.

15. A method of processing a feed stream comprising:
    a) passing a feed stream through a rotary valve assembly;
    b) passing the feed stream from the rotary valve assembly to one of a plurality of reciprocating valve assemblies based on the alignment of the rotary valve assembly;
    c) processing the feed stream from the one of a plurality of reciprocating valve assemblies in an adsorbent bed unit dedicated to the one of a plurality of reciprocating valve assemblies to separate one or more contaminants from the feed stream to form a product stream;
    d) conducting away from the adsorbent bed unit the product stream;
    e) rotating one or more components in the rotary valve assembly to a subsequent alignment, wherein the subsequent alignment stops fluid flow to the one of a plurality of reciprocating valve assemblies from the rotary valve assembly and permits fluid flow to a subsequent one of the plurality of reciprocating valve assemblies;
    f) processing the feed stream from the subsequent one of a plurality of reciprocating valve assemblies in a subsequent adsorbent bed unit dedicated to the subsequent one of a plurality of reciprocating valve assemblies to separate one or more contaminants from the feed stream to form a product stream; and
    g) conducting away from the subsequent adsorbent bed unit the product stream; and
    h) repeating the steps a-g for at least one additional cycle.

16. The method of claim 15, comprising: rotating at least one transmitter magnet relative to a plurality of receiver magnets, wherein at least one of the plurality of receiver magnets is associated with one of the plurality of reciprocating valve assemblies and is in communication with a sensor configured to transmit a signal to one of the plurality of reciprocating valve assemblies that actuates the one of the plurality of reciprocating valve assemblies.

17. A swing adsorption system comprising:
    a rotary valve assembly;
        a plurality of reciprocating valve assemblies, wherein each of the plurality of reciprocating valve assemblies is in fluid communication with the rotary valve assembly via a dedicated conduit;
        a plurality of adsorbent bed units, wherein each of the plurality of adsorbent bed units is in fluid communication with the rotary valve assembly via one of the plurality of reciprocating valve assemblies; and wherein the rotary valve assembly is disposed within a central housing and wherein a first portion of the plurality of adsorbent bed units are disposed equidistantly from the central housing by a first radii and a second portion of the plurality of adsorbent bed units are disposed equidistantly from the central housing by a second radii.

18. A swing adsorption system comprising:
a rotary valve assembly;
    a plurality of reciprocating valve assemblies, wherein each of the plurality of reciprocating valve assemblies is in fluid communication with the rotary valve assembly via a dedicated conduit;
    a plurality of adsorbent bed units, wherein each of the plurality of adsorbent bed units is in fluid communication with the rotary valve assembly via one of the plurality of reciprocating valve assemblies; and
    wherein at least one of the plurality of adsorbent bed units has a reciprocating valve assembly that is dedicated for each stream that passes through the adsorbent bed unit as part of the adsorption cycle.

19. A swing adsorption system comprising:
a rotary valve assembly;
    a plurality of reciprocating valve assemblies, wherein each of the plurality of reciprocating valve assemblies is in fluid communication with the rotary valve assembly via a dedicated conduit;
    a plurality of adsorbent bed units, wherein each of the plurality of adsorbent bed units is in fluid communication with the rotary valve assembly via one of the plurality of reciprocating valve assemblies; and
    at least one bellows is coupled to the conduit disposed between the rotary valve assembly and the one of the plurality of reciprocating valve assemblies, wherein the at least one bellows is configured to adsorb thermal expansion and contraction of the conduit.

20. A swing adsorption system comprising:
a rotary valve assembly;
    a plurality of reciprocating valve assemblies, wherein each of the plurality of reciprocating valve assemblies is in fluid communication with the rotary valve assembly via a dedicated conduit;
    a plurality of adsorbent bed units, wherein each of the plurality of adsorbent bed units is in fluid communication with the rotary valve assembly via one of the plurality of reciprocating valve assemblies; and
    further comprising a second rotary valve assembly; and a second plurality of reciprocating valve assemblies, wherein each of the second plurality of reciprocating valve assemblies is in fluid communication with the second rotary valve assembly via a dedicated conduit and is in fluid communication with one of the plurality of adsorbent bed units.

\* \* \* \* \*